(12) United States Patent
Abe

(10) Patent No.: US 7,060,386 B2
(45) Date of Patent: *Jun. 13, 2006

(54) NONAQUEOUS ELECTROLYTE SOLUTION SECONDARY BATTERY

(75) Inventor: Takao Abe, Fukushima (JP)

(73) Assignee: Sony Corporation, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 10/850,547

(22) Filed: May 20, 2004

(65) Prior Publication Data

US 2004/0214075 A1 Oct. 28, 2004

Related U.S. Application Data (63) Continuation of application No. 09/760,926, filed on Jan. 16, 2001, now Pat. No. 6,805,991.

(30) Foreign Application Priority Data

Jan. 14, 2000 (JP) ............................. P2000-006747
Jan. 25, 2000 (JP) ............................. P2000-016108

(51) Int. Cl.
H01M 2/12 (2006.01)
H01M 2/34 (2006.01)

(52) U.S. Cl. .......................................... 429/56; 429/53

(58) Field of Classification Search ..................... None
See application file for complete search history.

(56) References Cited

U.S. PATENT DOCUMENTS 5,418,082 A * 5/1995 Taki et al. ..................... 429/53
6,805,991 B1 * 10/2004 Abe ............................. 429/56

FOREIGN PATENT DOCUMENTS

JP 2000-21380 * 1/2000

* cited by examiner

*Primary Examiner*—Jonathan Crepeau
(74) *Attorney, Agent, or Firm*—Sonnenschein Nath & Rosenthal LLP (57) ABSTRACT

A nonaqueous electrolyte secondary battery which can reliably perform a current cut-off operation in a current cut-off state and can release a gas in a cleavage state. In the nonaqueous electrolyte secondary battery, an electrode element is held in a circularly cylindrical outer packaging can. A lid, a PTC element, and a safety valve are caulked on one end side of the outer packaging can through a gasket to seal one end of the outer packaging can. At the central portion of the safety valve, a projecting portion projecting toward the electrode element is formed. The projecting portion is welded on a sub-disk welded on the free end of a positive electrode lead. In the safety valve, a plurality of linear thin portions are formed along two circles centering on the projecting portion. A thin portion extending in a radial direction is formed across the end portions of the thin portions adjacent to each other. In this manner, by the plurality of thin portions, one continuous thin portion is formed.

4 Claims, 9 Drawing Sheets

NONAQUEOUS ELECTROLYTE SOLUTION SECONDARY BATTERY

RELATED APPLICATION DATA

The present application claims priority to Japanese Application Nos. P2000-006747 filed Jan. 14, 2000, P2000-016108 filed Jan 25, 2000, and is a continuation of U.S. application Ser. No. 09/760,926, filed Jan. 16, 2001 now U.S. Pat. No. 6,805,991, all of which are incorporated herein by reference to the extent permitted by law.

BACKGROUND OF THE INVENTION

1. Field of the Invention

The present invention relates to a safety valve and a nonaqueous electrolyte secondary battery using the same.

2. Description of the Related Art

In recent years, portable information devices such as lap-top computers and wordprocessors, AV devices such as camera integrated video tape recorders and liquid crystal television sets, and mobile communication devices such as portable telephones are remarkably developed. For batteries used as power supplies, secondary batteries having small sizes, light weights, and high energy densities are demanded. Until now, aqueous-solution-based secondary batteries such as a lead battery, a nickel-cadmium battery, and a nickel-hydrogen battery are used. These aqueous-solution-based secondary batteries sufficiently satisfy the demands related to light weights and high energy densities.

Recently, as clean batteries having high energy densities, nonaqueous electrolyte secondary batteries attract considerable attentions and are greatly expected.

A conventional nonaqueous electrolyte secondary battery will be described below with reference to FIGS. 4 to 6.

Figure 4A:
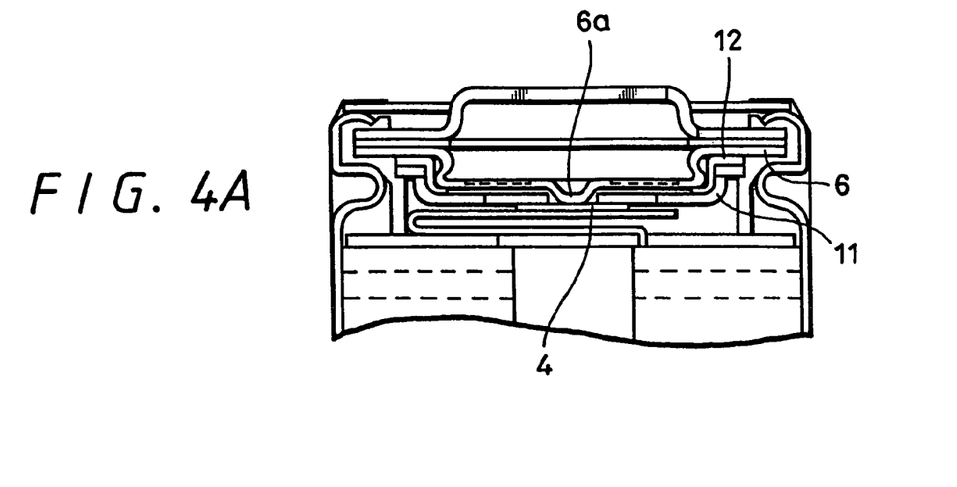
FIGS. 4A–C is a cross-sectional view showing the configuration of a safety valve used in a nonaqueous electrolyte secondary battery according to the second invention in a normal state and a cleavage manner in a cleavage state; Please amend the paragraph beginning on page 10, line 25 as follows.

FIG. 4 is a sectional view showing a conventional nonaqueous electrolyte secondary battery (e.g., disclosed in Japanese laid-open patent publication No. 8-315798).

In the nonaqueous electrolyte secondary battery, an electrode element 2 is a cylindrical bottomed outer packaging can 1 holds an electrode element 2 therein, a nonaqueous electrolytic solution (not shown) is injected into the outer packaging can 1, and the nonaqueous electrolytic solution soaks in the electrode element 2.

The electrode element 2 is constituted such that a positive electrode and a negative electrode each formed by a mixture obtained by mixing an active material, a binder, and a conductor with a elongated current collector are-laminated across a micro-porous separator as positive electrode and negative electrode, and the laminated structure is winded around, e.g., a cylindrical core in the form of a spirally coiled electrode.

The electrode element 2 is inserted into the outer packaging can 1 such that the leading side of a negative electrode lead 10 faces the bottom side of the outer packaging can 1. On the both sides of the electrode element 2, insulation plates are arranged, and free ends of the leads 9 and 10 of the electrode element 2 are led to the outside of the insulating plates. The free end of the negative electrode lead 10 is welded on the bottom surface of the outer packaging can 1 serving as an electrode terminal leading portion.

A lid 7, a PTC element 3, and a safety valve 6 are caulked on one end side of the outer packaging can 1 through a gasket 8 to seal one end of the outer packaging can 1.

At the central portion of the safety valve 6, a projecting portion 6a projecting toward the electrode element 2 is formed. The projecting portion 6a is welded on a sub-disk 4 welded on the free end of the positive electrode lead 9. In this manner, the projecting portion 6a is electrically connected to the positive electrode lead 9 of the electrode element 2.

A safety valve used in a conventional nonaqueous electrolyte secondary battery will be described below with reference to FIGS. 5 and 6.

Figure 5A:
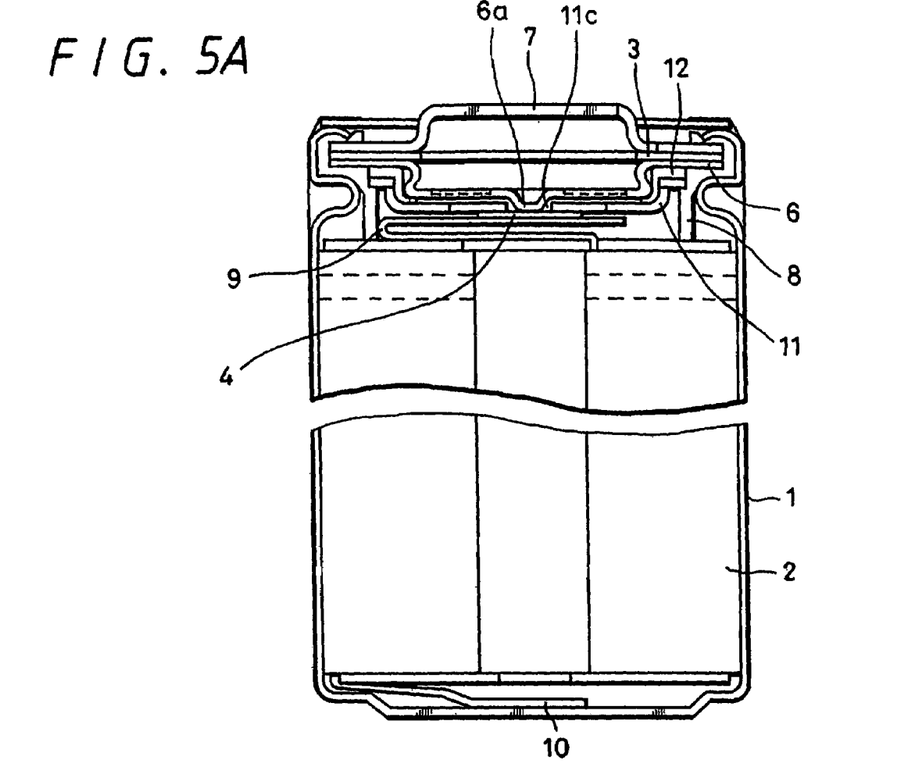
FIGS. 5A–D is a plan view showing a cleavage manner in a cleavage state in the second invention.

The configuration of the safety valve will be described below. FIG. 5A is a sectional view showing an action of the safety valve in a normal state of the conventional nonaqueous electrolyte secondary battery. FIG. 5A shows the upper portion of FIG. 4.

Figure 6:
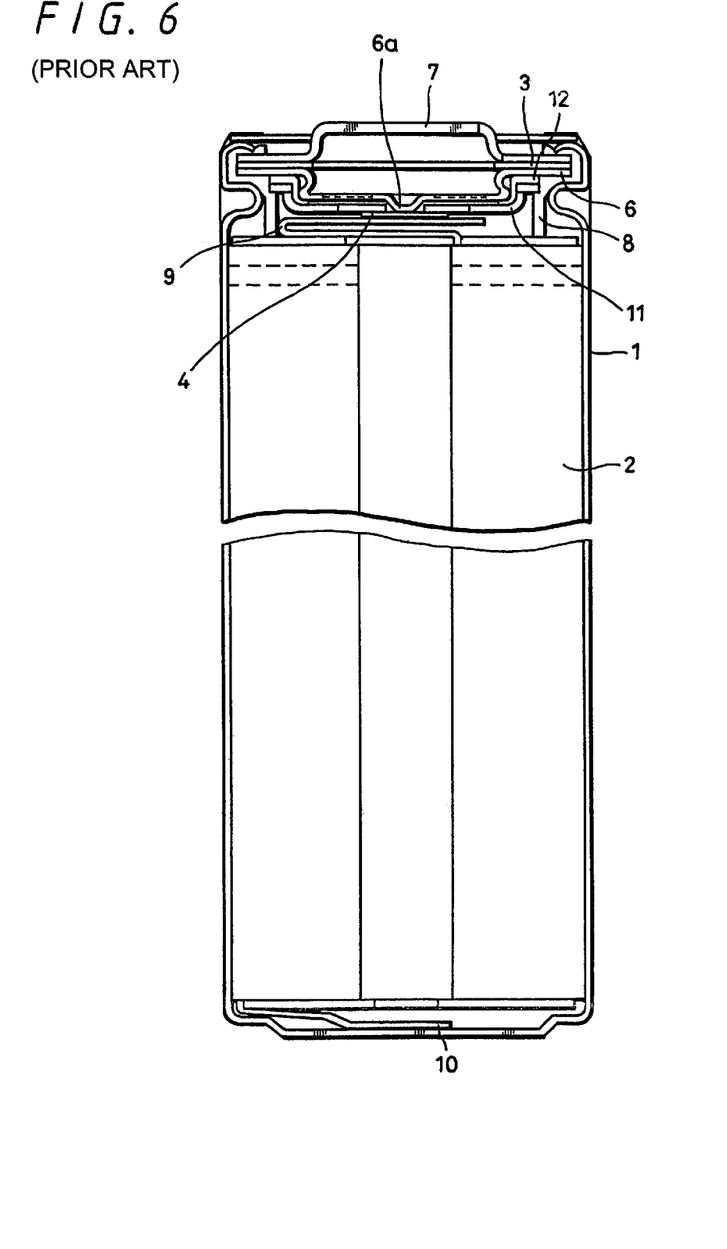
FIG. 6 is a cross-sectional view showing a conventional nonaqueous electrolyte secondary battery.
Figure 7A:
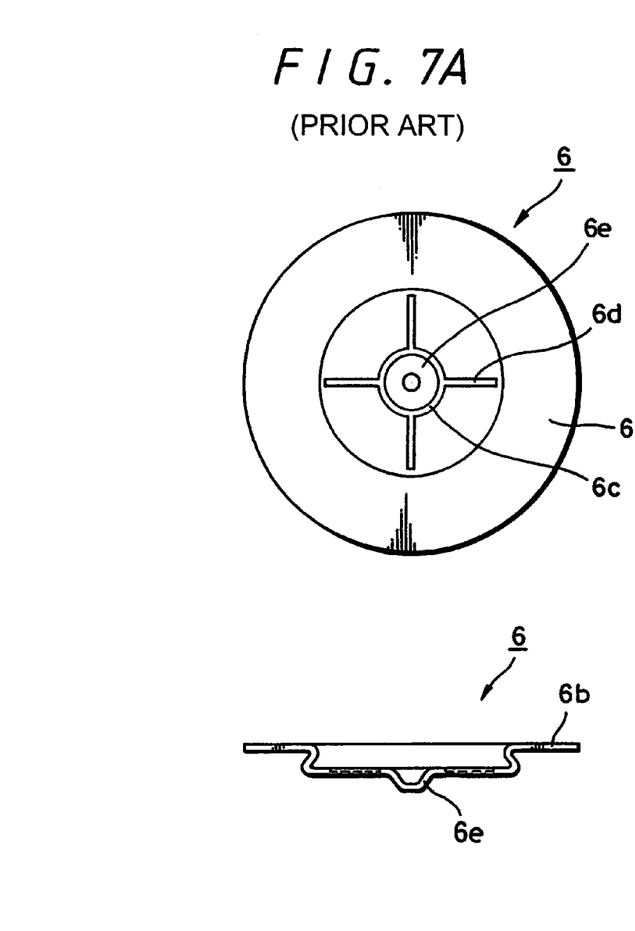
FIGS. 7A–B is a cross-sectional view showing an action of a safety valve in a normal state, a current cut-off state, and a cleavage state in a conventional nonaqueous electrolyte secondary battery.
Figure 7B:
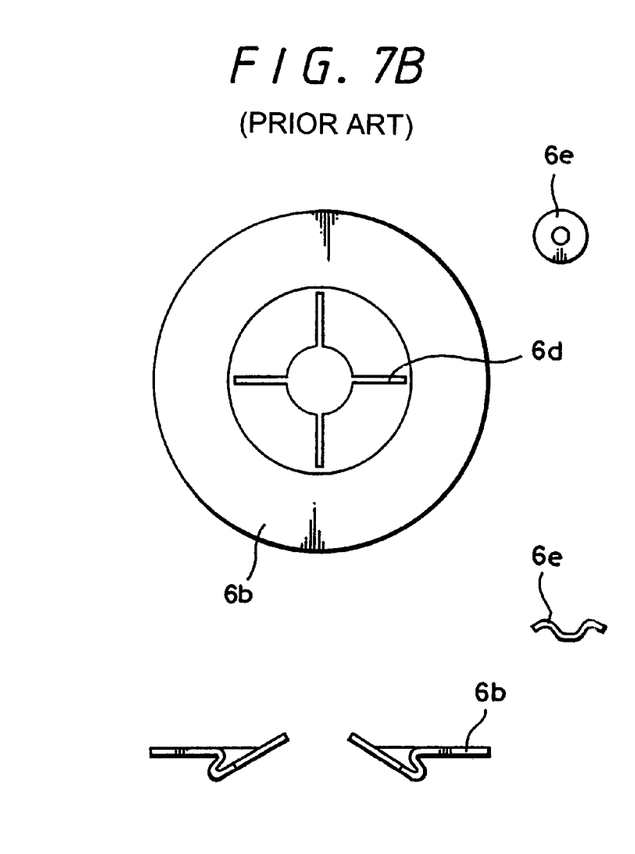
Figure 8A:
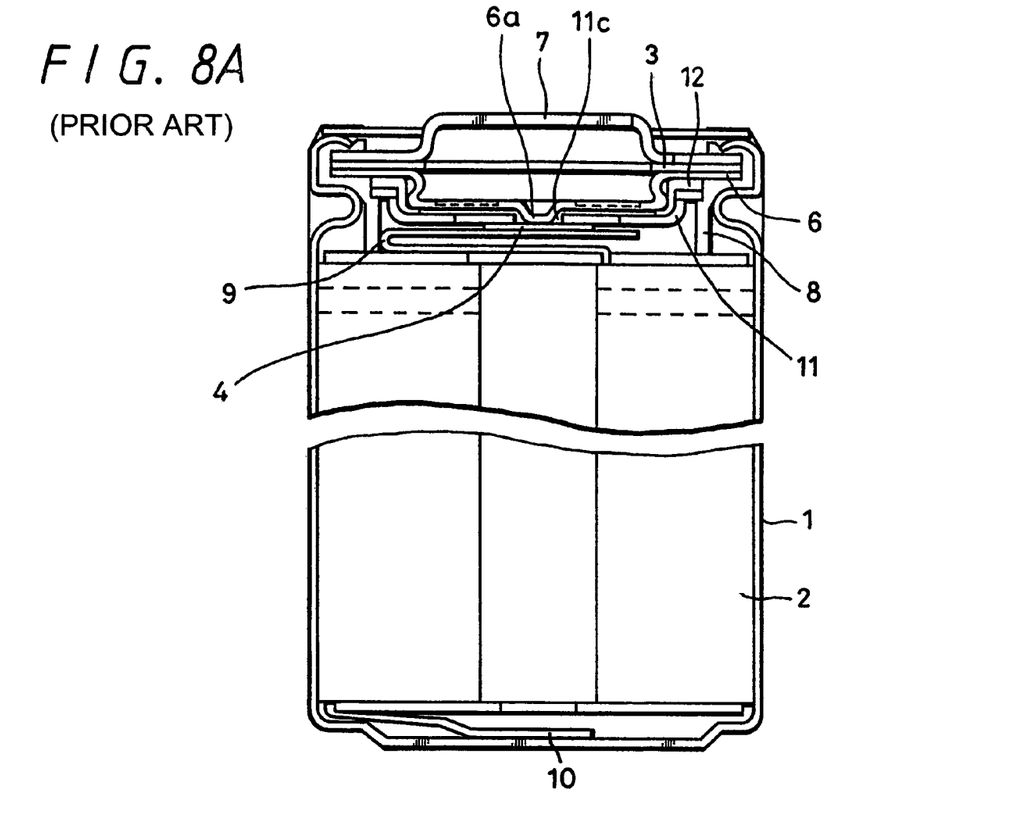
FIGS. 8A–B includes a plan view and a cross-sectional view showing the configuration of a safety valve in a conventional nonaqueous electrolyte secondary battery in a normal state and a cleavage manner in a cleavage state.
Figure 8B:
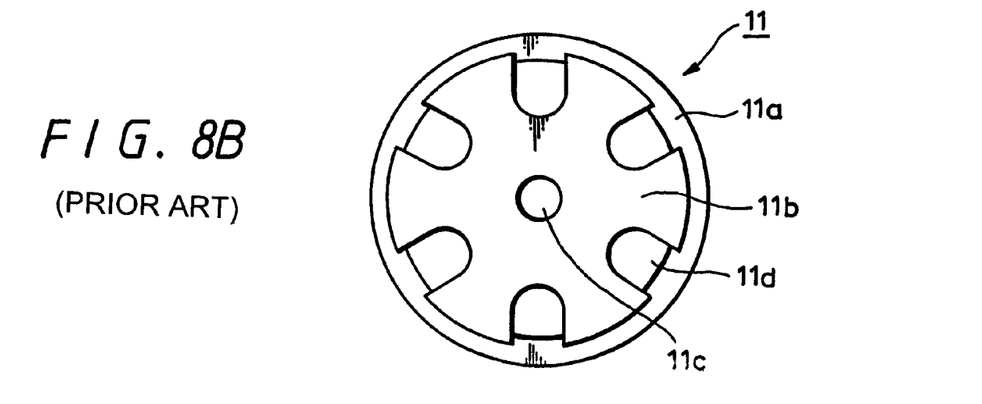

FIG. 6 is a plan view and a sectional view which show the configuration of the safety valve used in the conventional nonaqueous electrolyte secondary battery in a normal state. As shown in FIG. 6, a linear thin portion 6c is formed almost along a circle centering on the projecting portion 6a. In addition, four thin portions 6d extending in the radial direction are formed outside the linear thin portion 6c.

The disk 11 is fixed on the inner side of the safety valve 6 through a disk holder 12.

The shape of the disk 11 will be described here. FIG. 4B is a plan view of a disk used in a conventional nonaqueous electrolyte secondary battery.

Figure 4B:
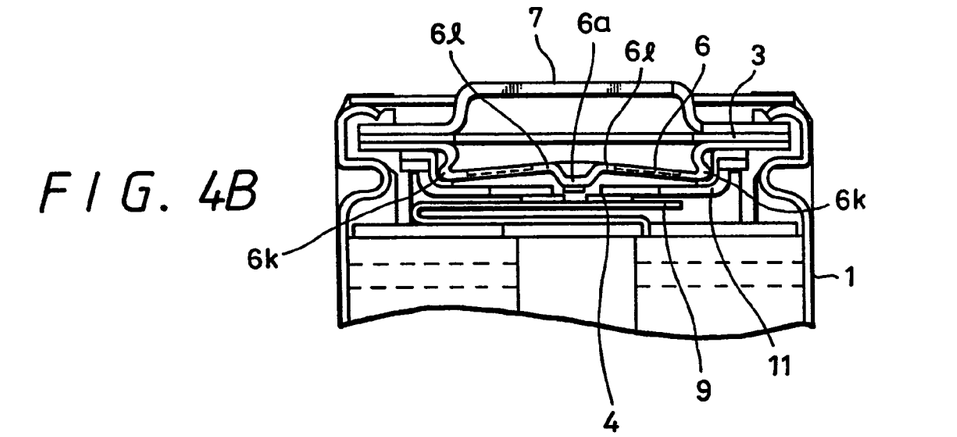

In FIG. 4B, an edge portion 11a is a belt-like plate which partially constitutes the disk 11 and has a circular shape at the outside of the plate. The outer edge portion 11a itself is fixed to the gasket 8 to support the disk 11 as a whole.

A depressed portion 11b partially constitutes the disk 11. The shape of the depressed portion 11b is a flat plate and is connected to the edge portion 11a.

The disk 11 has a central hole 11c. The central hole 11c is a circular hole centering the symmetrical point of the disk 11.

A peripheral hole lid is an almost rectangular hole having a semicircular portion on the central hole 11c side, and the central axis of the peripheral hole 11d is in the radial direction.

The sub-disk 4 shown in FIG. 4A has a thin-disk-like shape, and is welded on the electrode element 2 of the disk 11 at the center of the disk 11.

A positive electrode lead 9 is welded on the electrode element 2 of the sub-disk 4. In this manner, the sub-disk 4 and the positive electrode lead 9 are electrically connected to each other.

The operation of the safety valve will be described below with reference to FIGS. 5 and 6. In this case, the safety valve 6 has two mechanisms, i.e., a current cut-off mechanism and a cleavage mechanism.

Figure 5B:
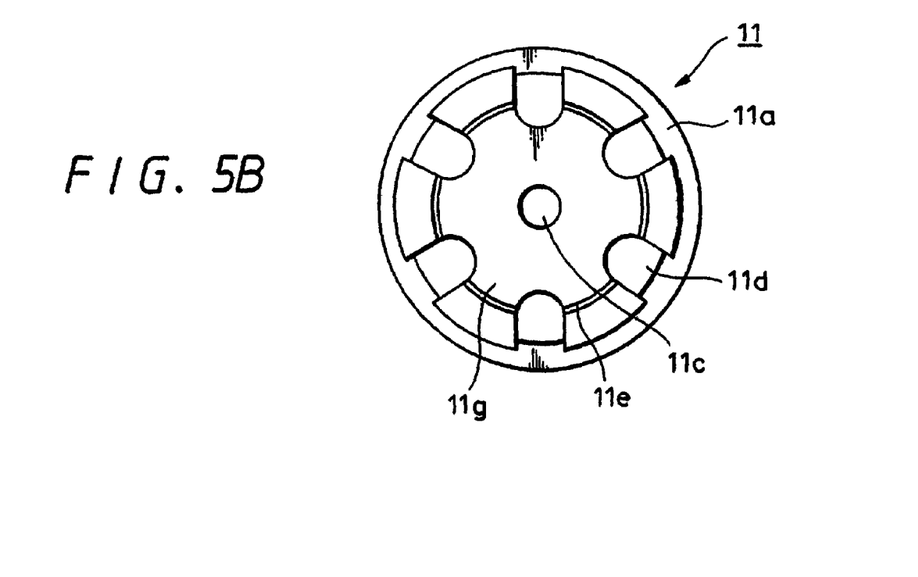

An operation in the current cut-off mechanism will be described below. FIG. 5B is a sectional view showing an action of a safety valve in a current cut-off state in the conventional nonaqueous electrolyte secondary battery.

When a gas is generated in the outer packaging can 1 for some reason, the internal pressure increases. At this time, the generated gas passes through a hole existing near the outer periphery of a disk 11 to pressurize the internal surface of the safety valve 6. In this manner, the safety valve 6 is transformed outside.

Figure 2A:
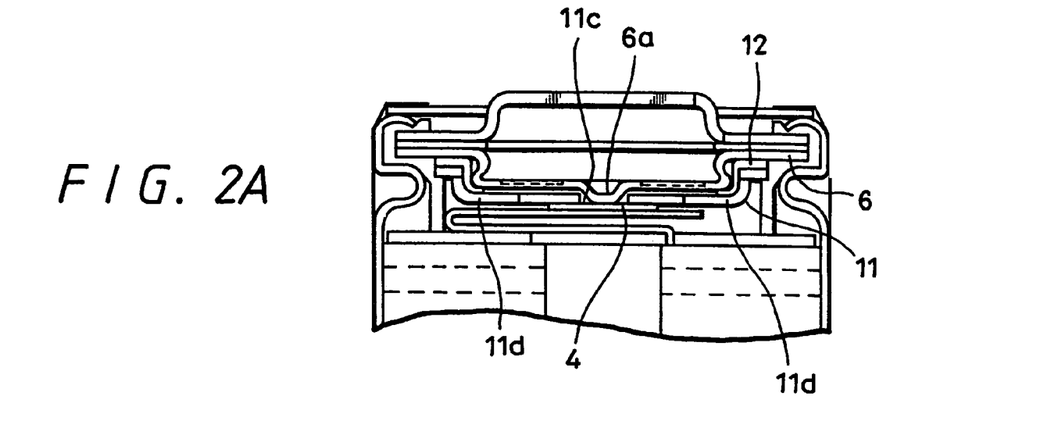
FIGS. 2A–C is a cross-sectional view showing an action of a safety valve in a normal state, a current cut-off state, and a cleavage state in the nonaqueous electrolyte secondary battery according to the present invention.

In FIG. 2A, although the sub-disk 4 closes the central hole 11c of the disk 11, the diameter of the sub-disk 4 is small. For this reason, the hole formed near the outer periphery of the disk 11 is not closed by the sub-disk 4. Since the peripheral hole 11d of the disk 11 is not closed as described above, a gas existing in the battery can pass through the disk 11. In contrast to this, since the safety valve 6 has no hole, the gas existing in the battery cannot be discharged outside, and an airtight state is kept.

In addition, at the welded portion between the projecting portion 6a of the safety valve 6 and the sub-disk 4, the sub-disk 4 existing around the welded portion is torn by shearing force. In this manner, when the projecting portion 6a and the sub-disk 4 are separated from each other, an electric connection between the positive electrode lead 9 of the electrode element 2 and the lid 7 is cut.

Here, the transformation of the safety valve 6 will be further described. As shown in FIG. 5B, when the safety valve 6 is transformed, the safety valve 6 is largely transformed at positions 6k and 6l. More specifically, the position 6k indicates the outer periphery of a flat region inside the safety valve 6, and the position 6l indicates a position which is very close to the projecting portion 6a. The position 6l which is the bending point of these portions corresponds to the portion of the thin portion 6c in FIG. 6A. Since the portion of the thin portion 6c is mechanically weakest, the thin portion 6c is maximally transformed by pressure.

In addition, due to the transformation of the safety valve 6, at the welded portion between the projecting portion 6a of the safety valve 6 and the sub-disk 4, the sub-disk 4 existing around the welded portion is torn by shearing force. In this manner, when the projecting portion 6a and the sub-disk 4 are separated from each other, an electric connection between the positive electrode lead 9 of the electrode element 2 and the lid 7 is cut.

As is apparent from FIG. 5B, the distance between the bending points 6k and 6l is large. For this reason, due to the transformation of the safety valve 6, the projecting portion 6a is largely separated from the sub-disk 4. In this manner, since the projecting portion 6a and the sub-disk 4 are largely separated from each other, a current cut-off operation can be reliably performed.

Figure 5C:
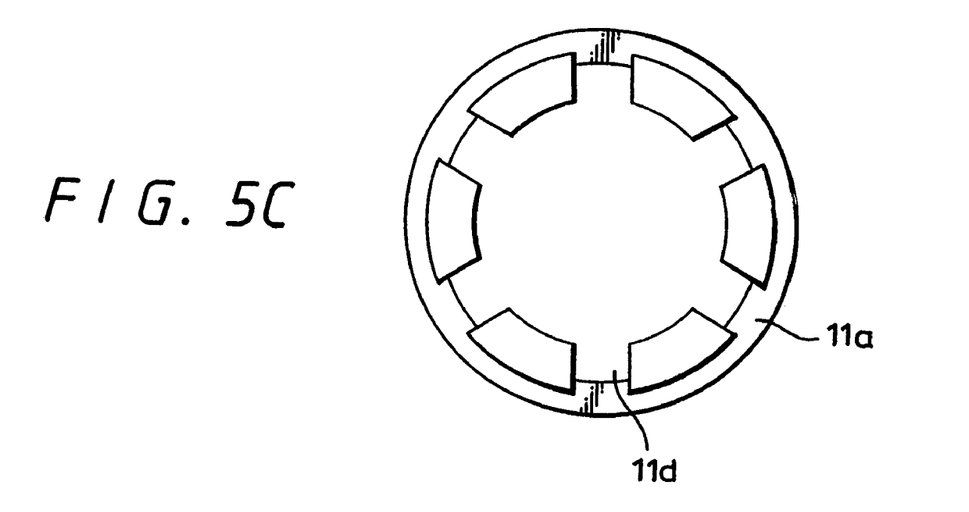
Figure 5D:
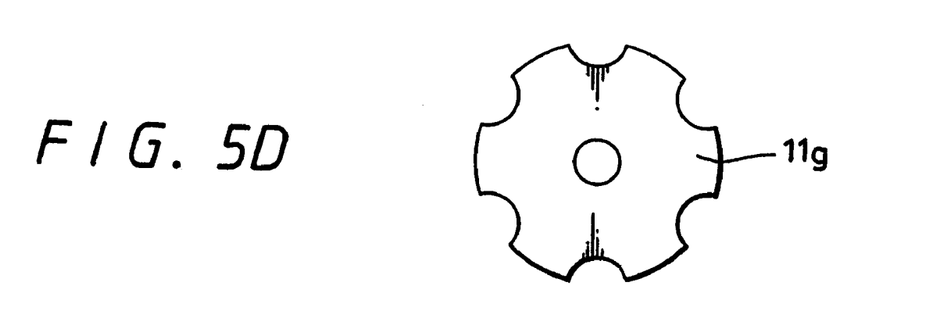

An operation in the cleavage mechanism will be described below. FIG. 5C is a sectional view showing the action of a safety valve of the conventional nonaqueous electrolyte secondary battery in a cleavage state.

When the pressure in the outer packaging can 1 is higher than the pressure in the current cut-off state, the safety valve 6 itself is cleaved so that a generated gas is released through a ventilation hole formed in the lid 7.

A cleaving operation of the safety valve 6 will be described below with reference to FIG. 6B. FIG. 6B includes a plan view and a sectional view showing a cleaving manner of a safety valve used in a conventional nonaqueous electrolyte secondary battery in a cleavage state.

Here, a series of cleaving-operations is performed in the following order. More specifically, first, the thin portion 6c along the circle is cleaved along the groove of the thin portion 6. Tensile force in a direction perpendicular to the direction of the groove acts on the thin portions 6d which are radially formed, and the thin portions 6d are cleaved along the groove. In this case, as shown in FIG. 5C, the thin portion 6c which is not cleaved may partially remain.

As described above, when the pressure in the outer packaging can 1 increases, the thin portion 6c and the thin portions 6d are continuously cleaved. For this reason, the generated gas can be discharged outside after the safety valve 6 is cleaved.

However, in the conventional nonaqueous electrolyte secondary battery, although the thin portion 6c is almost completely cleaved, the thin portions 6d are only half cleaved from the center of the safety valve 6, and the widths of the cleavages are also small. More specifically, the passage area for the generated gas is only an area corresponding to a separate portion 6e and the small gaps of the thin portions 6d formed the circumference. Therefore, when a gas is generated in the outer packaging can 1, the conventionally used safety valve cannot release the generated gas outside within a short time.

As a solving means for the problems, an increase of the opening area of the peripheral hole 11d can be considered. However, the opening area is increased, the mechanical strength of the disk 11 itself cannot be easily assured. In order to assure the mechanical strength, the thickness of the disk 11 may be increased. However, when the thickness is increased, the capacity of the battery must be decrease. For this reason, it is actually difficult to increase the opening area of the peripheral hole 11d.

SUMMARY OF THE INVENTION

The present invention has been made in view of the above problem, and its object is to provide a nonaqueous electrolyte secondary battery which can reliably perform a current cut-off operation in a current cut-out state and can release a gas within a short period of time in a cleavage state.

A nonaqueous electrolyte secondary battery according to the present invention is a nonaqueous electrolyte secondary battery in which a safety valve is arranged on one end side of a cylindrical outer packaging can holding an electrode element therein, the safety valve having a projecting portion projecting toward the electrode element and connected to a lead of the electrode element at the center of the safety valve, wherein a plurality of linear thin portions are formed almost along at least two circumferences centering on the projecting portion, and a thin portion extending in a radial direction is formed across end portions of the linear thin portions adjacent to each other.

In this case, the lengths of the plurality of linear thin portions along the same circumference are almost equal to each other.

According to the nonaqueous electrolyte secondary battery of the present invention, the plurality of linear thin portions are formed almost along at least two circumferences centering on the projection portion, and the thin portion extending in the radial direction is formed across the end portions of the linear thin portions adjacent to each other. For this reason, a sufficient long distance can be obtained as the distance between the projecting portion and the lead, and a passage area for gas in a cleavage state increases.

A second nonaqueous electrolyte secondary battery according to the present invention is a nonaqueous electrolyte secondary battery in which at least a disk and a safety valve are arranged on one end side of a cylindrical outer packaging can holding an electrode element therein, the disk has a central hole, the safety valve has a projecting portion projecting toward the electrode element at the central portion of the safety valve, and the projecting portion is connected to a lead of the electrode element through the central hole of the disk. The disk has a linear thin portion.

The nonaqueous electrolyte secondary battery according to the present invention is a nonaqueous electrolyte secondary battery having the configuration in which the thin portion is almost along a circle centering on a symmetrical point of the central hole.

DESCRIPTION OF THE PREFERRED EMBODIMENTS

An embodiment of the present invention according to a nonaqueous electrolyte secondary battery will be described below with reference to FIGS. 1 to 3.

Figure 1:
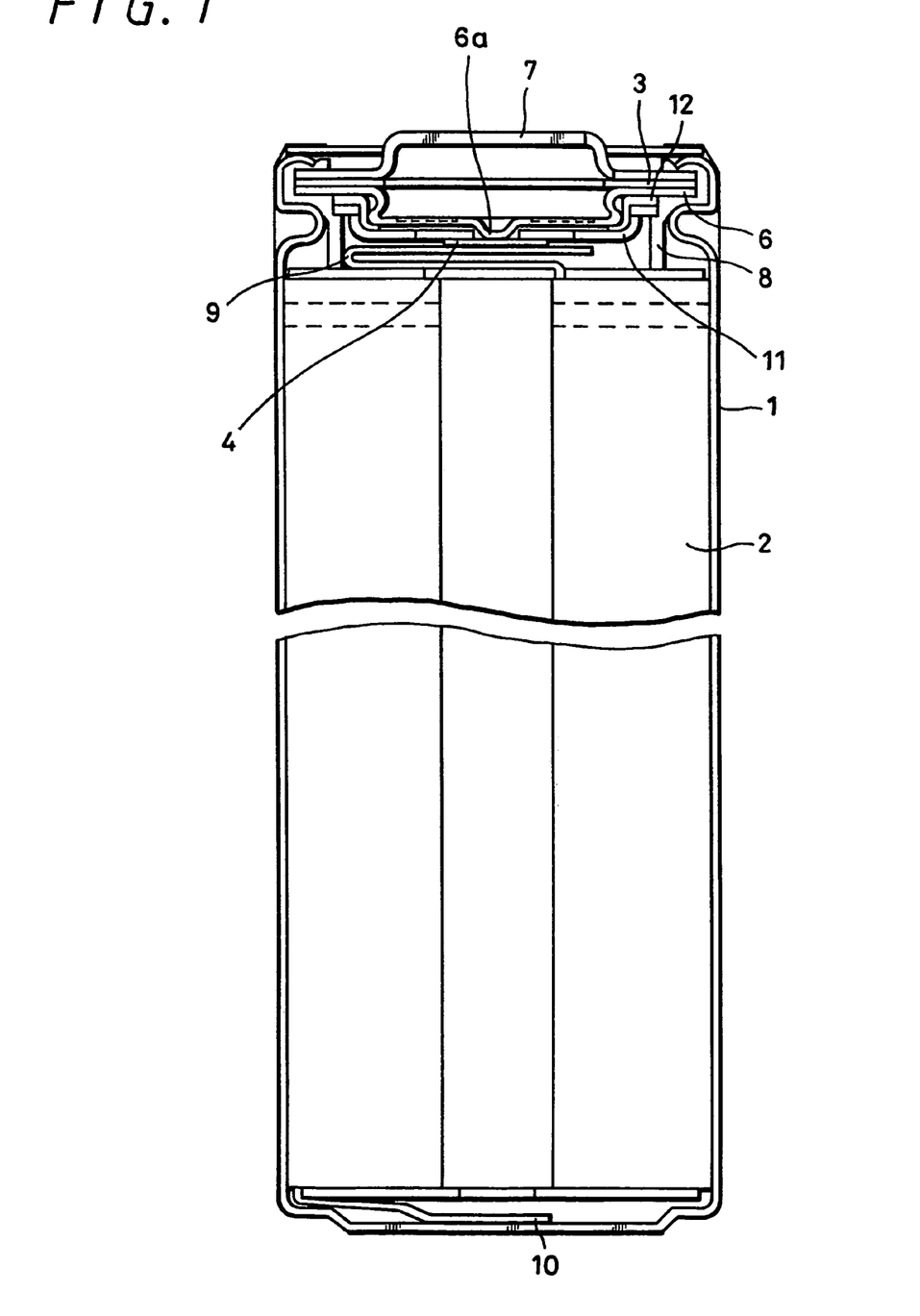
FIG. 1 is a sectional view showing an embodiment of the present invention according to a nonaqueous electrolyte secondary battery.

FIG. 1 is a cross-sectional view showing the embodiment of the present invention with respect to the nonaqueous electrolyte secondary battery. This embodiment is obtained by applying the present invention to a nonaqueous electrolyte secondary battery comprising a material in which lithium can be doped or undoped as a positive electrode and (or) a cathode electrode, and a nonaqueous electrolytic solution. However, the present invention is not limited to this embodiment and the example in FIG. 1.

In this embodiment, an electrode element 2 is held in a cylindrical bottomed outer packaging can 1 consisting of iron and plated with nickel (Ni), and a nonaqueous electrolytic solution (not shown) is injected into the outer packaging can 1, and the nonaqueous electrolytic solution soaks in the electrode element 2.

The outer packaging can 1 is not limited to the cylindrical can. In addition to the cylindrical battery, a prismatically cylindrical battery may be used.

The electrode element 2 is constituted such that a micro-porous positive electrode and a micro-porous negative electrode are laminated across a micro-porous separator, and the laminated films are wrapped around, e.g., a circularly cylindrical core in the form of a coiled electrode.

The positive electrode and the negative electrode of the electrode element 2 are formed such that a positive electrode active material and a negative electrode active material are coated on both the surfaces of a elongated current collecting foil consisting of an aluminum (Al) foil and a copper (Cu) foil.

One end of a positive electrode lead 9 consisting of Al and one end of a negative electrode lead 10 consisting of Ni are welded from opposite end portions of the current collecting foils of the positive electrode and the negative electrode. As shown in FIG. 1, the positive electrode lead 9 is led outside the electrode element 2 from the central portion of the electrode element 2, and the negative electrode lead 10 is led from the outer periphery of the electrode element 2.

The electrode element 2 is inserted into the outer packaging can 1 such that the leading side of the negative electrode lead 10 faces the bottom side of the outer packaging can 1.

Insulating thin plates are arranged on the both sides of the electrode element 2, and the free ends of the leads 9 and 10 of the electrode element 2 are led outside the insulating thin plates. The free end of the negative electrode lead 10 is welded on the bottom surface of the outer packaging can 1 serving as, e.g., an electrode terminal leading portion.

In the electrode element 2, as the positive electrode active material of the positive electrode, a material in which, e.g., Li can be undoped and re-doped, a complex oxide expressed by an active material $Li_xMO_2$ (M is one transition metal selected from of Co, Ni, and Mn, $0.4 \leq x \leq 1.1$) consisting of, e.g., a lithium transition metal complex oxide, among other things, $LiCoO_2$, $LiNiO_2$, $LiMn_2O_4$, or the like is preferably used. Such a lithium transition metal oxide can be obtained by the following method. That is, for example, a carbonate, nitrate, oxide, a hydroxide, and the like of Li, Co, Ni, and Mn are used as start materials, and these starting row materials are mixed with each other depending on a composition and burned in a temperature range of 600° C. to 1,000° C.

As the negative electrode active material of the negative electrode, a low crystalline carbon material obtained by burning a material in which, e.g., Li can be doped or undoped at a relatively low temperature of, e.g., 2,000° C. or less, a high crystalline material such as artificial graphite or natural graphite obtained by treating a material which can be easily crystallized at a high temperature of about 3,000° C., or the like is used. For example, thermolysis carbons, cokes, graphites, glass-like carbons, organic high molecular compound burned materials (obtained by sintering a furan resin or the like at an appropriate temperature and carbonized the resultant material), a carbon fiber, and an activated carbon can be used.

As the low crystalline carbon material, a carbonaceous material which is obtained by sintering a furan resin, a petroleum pitch, or the like at less than 1,500° C. and carbonating the resultant material, in which a spacing of (002) surfaces obtained by a wide angle X-ray differential method is 3.70 Å or more and the degree of vacuum is less than 1.70 g/cm³, and which does not have a heat generation peak of 700° C. or more in a differential thermal analysis in an air current is preferably used. As a graphite powder, a carbonaceous material in which a spacing of (002) surfaces obtained by a wide angle x-ray differential method is less than 3.42 Å is preferably used. These carbonaceous materials are materials which have large amounts of doped and undoped Li and are excellent in charge/discharge cycle life performance. As a combination of the negative electrode material and the positive electrode material, a combination which is most appropriate to a device to be used can be selected.

The separator can be constituted by a porous membrene with a micro-porous film consisting of polyolefin resin, e.g., polyethylene, polypropylene, or teflon.

The nonaqueous electrolytic solution consists of an organic solvent and an electrolyte solved therein. A so-called polymer electrolyte obtained by mixing a nonaqueous electrolytic solution and a high molecular compound, or a polymer electrolyte obtained by mixing or combining a high molecular compound with an electrolyte can also used.

As the organic solvent, for example, at least one organic solvent selected from more than one kind of a cyclic carbonate such as ethylene carbonate or propylene carbonate, vinylene carbonate a chain carbonate such as dimethyl carbonate ethyl-methyl carbonate or diethyl carbonate, ethyl-methyl a cyclic ester such as γ-butyrolactone or γ-valerolactone, a chain ester such as ethyl acetate or methyl propionate, and an ether such as tetrahydrofuran or 1,2-dimethoxyethane can be used.

As the electrolyte, a lithium salt which can be solved in a solvent to be used and has ionic conductivity, e.g., at least one selected from $LiPF_6$, $LiBF_4$, $LiClO_4$, $LiCF_3SO_3$, $LiN(CF_3SO_2)_2$, and $LiC(CF_3SO_2)_3$ can be used.

A lid 7, a PTC element 3, and a safety valve 6 are caulked on one end side of the outer packaging can 1 through a gasket 8 to seal one end of the outer packaging can 1. More specifically, the lid 7 serving as a positive-side terminal leading portion consisting of, e.g., stainless steel, Ni, or Fe, the ring-like PTC element 3 having, e.g., positive temperature characteristics, and the safety valve 6 arranged inside the PTC element 3 and consisting of Al are caulked on the opening end of the outer packaging can 1 and sealed such that these members are pinched by the gasket 8.

At, e.g., the central portion of the safety valve 6, a projecting portion 6a projecting toward the electrode element 2 is formed. The projecting portion 6a is welded on a sub-disk 4 consisting of Al and welded on the free end of the positive electrode lead 9. In this manner, the projecting portion 6a is electrically connected to the positive electrode lead 9 of the electrode element 2.

A disk 11 having a central hole through which the projecting portion 6a of the safety valve 6 passes and which is constituted by, e.g., an Al metal plate is arranged between the safety valve 6 and the sub-disk 4 through a disk holder 12.

A safety valve used in the nonaqueous electrolyte secondary battery according to this embodiment will be described below with reference to FIGS. 2 and 3.

The configuration of the safety valve will be described below. FIG. 2A is a sectional view showing an action of a safety valve in a normal state in the nonaqueous electrolyte secondary battery according to this embodiment. FIG. 2A shows an upper portion of FIG. 1. Here, although the sub-disk 4 closes the center hole of the disk 11, the diameter of the sub-disk 4 is small. For this reason, the hole formed near the outer periphery of the disk 11 is not closed by the sub-disk 4. In addition, since the hole formed near the outer periphery of the disk 11 is not closed as described above, gas existing in the battery can pass through the disk 11. In contrast to this, the safety valve 6 has no hole, the gas existing in the battery cannot be released outside, and an airtight state is kept. This state is the normal state shown in FIG. 2A.

Figure 3A:
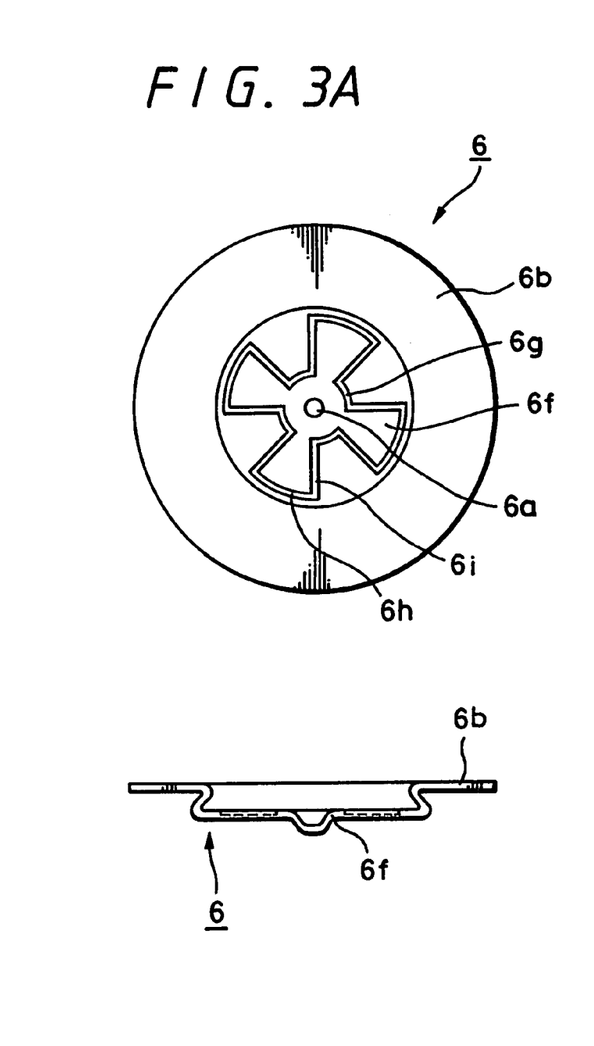
FIGS. 3A–B includes a plan view and a cross-sectional view which shown the configuration of the safety valve used in the nonaqueous electrolyte secondary battery according to this embodiment in the normal state and a cleavage manner in the cleavage state.

FIG. 3A includes a plan view and a sectional view which show the configuration of the safety valve used in the nonaqueous electrolyte secondary battery according to this embodiment in the normal state. As is apparent from FIG. 3A, a plurality of linear thin portions are formed almost along the circumferences of at least two circles centering on the projecting portion 6a. In FIG. 3A, a small circle having a small diameter (to be referred to as a "small-diameter circle" hereinafter) and a circle having a large diameter (to be referred to as a "large-diameter circle" hereinafter) exist, and the plurality of linear thin portions along the small-diameter circle and the large-diameter circle are shown. More specifically, four thin portions 6g along the small-diameter circle are formed near the projecting portion 6a. The lengths of the thin portions 6g are almost equal to each other. The chords on the small-diameter circle in which no thin portions 6g are formed are almost equal to each other.

Four thin portions 6h along the large-diameter circle are formed near the outer periphery of the safety valve 6. The lengths of the thin portions 6h are almost equal to each other, and the chords on the large-diameter on which the thin portions 6h are not formed are almost equal to each other.

In addition, thin portions 6i extending in the radial direction are formed across the ends of the thin portion 6g and the thin portion 6h which are adjacent to each other. In this manner, a shape having four fan-like leaves constituted by one continuous thin portion is formed by the thin portions 6g, the thin portions 6h, and the thin portions 6i. This shape is formed such that the same patterns are repeated every 90°.

In FIG. 3A, the thicknesses of the thin portions 6g, 6h, and 6i are 0.1 mm, and the thicknesses of the other portions except for the thin portions 6g, 6h, and 6i, i.e., a safety valve main body 6b and a separate portion 6f are 0.3 mm.

The number of leaves is not limited to four as described above. More specifically, the number of leaves is preferably set within the range of 2 to 10. When the number of leaves is one, the symmetry of the shape is lost. For this reason, in a cleavage operation (to be described later), the leaf portion may not be able to be sufficiently separated. When the number of leaves is larger than 10, the total length of the thin portions is excessively large, and large energy is required to shear the thin portions. For this reason, it may be rather difficult to perform the cleavage operation.

In the embodiment described above, two circles, i.e., the small-diameter circle and the large-diameter circles have been described as circles along which the thin portions must be. However, the present invention is not limited to the two circles. Three circles may be used. However, in order to smoothly perform the cleavage operation, the shape is preferably symmetrical with respect to a straight line connecting the center of the line of a thin portion along the maximum-diameter circle and the center of the projecting portion. The shape including one thin portion along the maximum-diameter circle described above is preferably a shape in which the same patterns are repeated at the same angle.

In this embodiment, as a line connecting the ends of adjacent thin portions, the straight line extending in the radial direction through the center of the projecting portion is employed. However, the present invention is not limited to the straight line. A straight line in the radial direction which does not pass through the center of the projecting portion may be used. A straight line is not necessarily used, and a curved line in the radial direction may be used.

In the embodiment described above, 0.1 mm is employed as the thicknesses of the thin portions 6g, 6h, and 6i. However, the present invention is not limited to this thickness. The thickness can be properly changed depending on the value of a pressure at which cleavage must be performed as a matter of course. In addition, not only the thicknesses of the thin portions 6g, 6h, and 6i are made to be uniform over the entire thin portions, but also at part of the thin portions the thicknesses may be partially changed, so that portions wherein cleavage easily occurs can also be formed.

The operation of the safety valve will be described below with reference FIGS. 2 and 3. In this case, the safety valve 6 has two mechanisms, i.e., a current cut-off mechanism and a cleavage mechanism.

An operation in the current cut-off mechanism will be described first. FIG. 2B is a sectional view showing the operation of a safety valve in a current cut-off state in the nonaqueous electrolyte secondary battery of the embodiment.

When gas is generated in the outer packaging can 1 for some reason, a pressure in the outer packaging can 1 increases. At this time, the generated gas passes through a hole existing near the outer periphery of the disk 11 to pressurize the inner surface of the safety valve 6. As a result, the safety valve 6 is pressed outside and expanded in the external direction to be transformed. This transformation increases the volume in the battery. Accordingly, the pressure can be moderated.

In addition, due to the transformation of the safety valve 6, at the welded portion between the projecting portion 6a of the safety valve 6 and the sub-disk 4, the sub-disk 4 existing around the welded portion is torn by shearing force. In this manner, when the projecting portion 6a and the sub-disk 4 are separated from each other, an electric connection between the positive electrode lead 9 of the electrode element 2 and the lid 7 is cut. More specifically, the sub-disk 4 is electrically connected to the safety valve 6 through the projecting portion 6a, the PTC element 3, and the lid 7. However, when the positive electrode lead 9 and the projecting portion 6a are separated from each other as described above, the electric connection between the positive electrode lead 9 and the lid 7 can also be cut.

Here, the transformation of the safety valve 6 will be further described in detail. As is apparent from FIG. 2B, when the safety valve 6 is transformed, and the safety valve 6 is largely transformed at the positions 6k and 6l. More specifically, the portions are the position 6k which indicates the outer periphery of the inner flat region of the safety valve 6 and the position 6l which is very close to the projecting portion 6a. The positions 6l which is the bending point corresponds to a portion along the small-diameter circle in FIG. 3A, i.e., the positions of the thin portions 6g. Since the positions of the thin portions 6g are mechanically weakest, the thin portions 6g are maximally transformed by pressure. Other portions except for these portions, i.e., the projecting portion 6a is rarely transformed, and the flat portion outside a projecting portion 6s is slightly transformed.

Figure 2B:
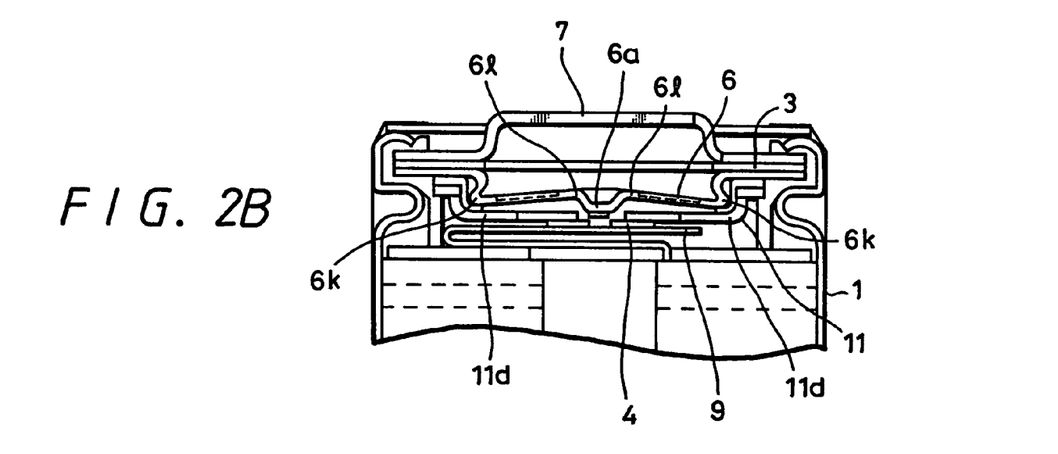

As is apparent from FIG. 2B, the distance between the bending points 6k and 6l is large. For this reason, by the transformation of the safety valve 6, the projecting portion 6a is largely separated from the sub-disk 4. In this manner, in the safety valve 6 used in this embodiment, as in a conventional safety valve, the projecting portion 6a and the sub-disk 4 can be largely separated from each other. As described above, since the projecting portion 6a and the sub-disk 4 can be largely separated from each other, an advantage that a current cut-off operation can be reliably performed is achieved.

In the conventional safety valve 6 described in FIG. 6A, the advantage described above cannot be achieved by simply increasing the diameter of the circle of the thin portion 6c. More specifically, in this case, since the thin portion is bent at the position of the thin portion 6c, the distance corresponding to the distance between the positions 6k and 6l in FIG. 2B decreases. As a result, the projecting portion 6a and the sub-disk 4 cannot be sufficiently separated from each other. As a result, the reliability of the current cut-off operation is degraded.

An operation in the cleavage mechanism will be described below. FIG. 2C is a sectional view showing the action of the safety valve in a cleavage state in the nonaqueous electrolyte secondary battery of this embodiment.

When a pressure in the outer packaging can 1 is higher than the pressure in the current cut-off operation, the safety valve 6 itself is cleaved so that generated gas is released through a ventilation hole formed in the lid 7.

The cleavage operation of the safety valve 6 will be described below with reference to FIG. 3B. FIG. 3B includes a plan view and a sectional view showing a cleavage manner in the cleavage state in the safety valve used in the nonaqueous electrolyte secondary battery of this embodiment.

Here, a series of cleavage operations is performed in the following order. More specifically, the thin portions 6g along the small-diameter circle are cleaved along the groove. As the projecting portion is separated from the safety valve by cleaving the thin portions 6g, shearing force acts on the thin portions 6i, and the thin portions 6i are cleaved along the groove. When all the thin portions 6i are cleaved, the thin portions 6h along the large-diameter circle are made tense in a direction perpendicular to the groove. For this reason, tensile stress acts on the thin portions 6h to cleave the thin portions 6h.

Figure 2C:
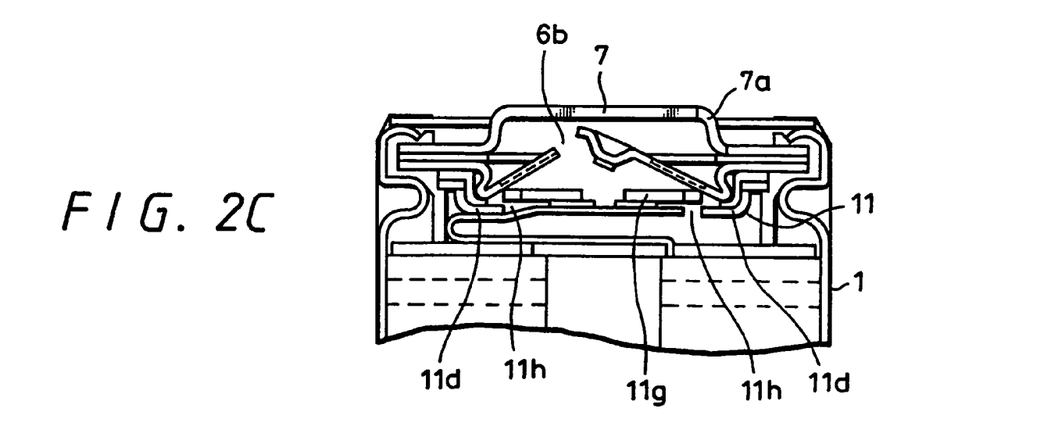

In this case, as shown in FIG. 2C, the thin portions 6h which are not cleaved may partially remain. This is determined depending on the magnitude of the pressure in the outer packaging can.

In this manner, when the pressure in the outer packaging can 1 increases, the thin portions 6g, 6i, and 6h are continuously cleaved. For this reason, the separate portion 6f surrounded by the thin portions 6g, 6i, and 6h can be entirely or almost entirely separated from the safety valve main body 6b within a short time. As a result, a sectional area through which the generated gas passes can be considerably increased, and the generated gas can be released outside within a short period of time after the safety valve 6 is cleaved.

In order to check the effect of the safety valve used in the nonaqueous electrolyte secondary battery of this embodiment, the current cut-off mechanism and the cleavage mechanism of the safety valve were studied.

Figure 3B:
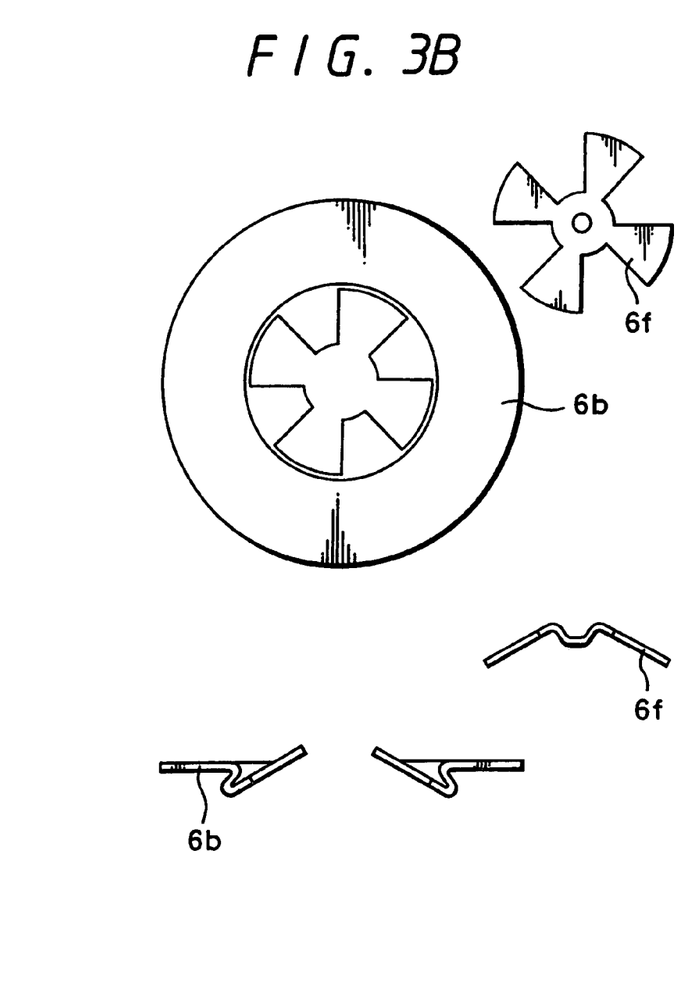

The safety valve used for the study is shown in FIG. 3. Also, the conventional safety valve in FIG. 6A was studied to compare with the safety valve of this embodiment.

Here, the safety valve of this embodiment and the conventional safety valve had flat portions having equal thicknesses and thin portions having equal thicknesses. The diameter of a circle corresponding to the thin portions 6g in the safety valve (FIG. 3A) used in this embodiment was made equal to the diameter of the circle corresponding to the thin portion 6c in the conventional safety valve (FIG. 6A). The radius of the large-diameter circle corresponding to the thin portions 6h in this embodiment (FIG. 3A) was made equal to a distance from the external end of the thin portion 6c to the center of the projecting portion in the prior art (FIG. 6A).

In this embodiment and the prior art, with respect to the studies of the current cut-off mechanism and the cleavage mechanism, a cylindrical battery was sealed by a safety valve without using an electrode element to be assembled, and a hydraulic cylinder was attached to the can bottom to perform a pressure test.

As a result of the studies, a current cut-off operation pressure in this embodiment was 1.5 MPa, and a current cut-off operation pressure in the prior art was 1.5 MPa. In this manner, as in this embodiment, a current cut-off operation can be performed at a pressure equal to that of the conventional safety valve.

In addition, a cleavage operation pressure in this embodiment was 2.5 MPa, and a cleavage operation pressure in the prior art was 2.5 MPa. In this manner, in this embodiment, the cleavage mechanism can be operated at a pressure equal to that of the conventional safety valve.

Cleavage manners in cleavage states were observed with respect to this embodiment and the prior art.

As a result, in this embodiment, as shown in FIG. 2C, all the thin portions 6g and all the thin portions 6i were cleaved. All the thin portions 6h were cleaved except for one portion. On the other hand, in the prior art, as shown in FIG. 5C, although the thin portion 6c is almost entirely cleaved, the thin portions 6d are only half cleaved from the center, and the widths of the cleavages are also small.

From the observation results, when the cleavage states of the safety valve used in this embodiment and the conventional safety valve are compared with each other, the passage area for generated gas is only an area corresponding to the portion 6e of the central circle and the small gaps of the thin portions 6d formed in the circumference in the prior art. In this embodiment, since the separate portion 6f is almost separated, the passage area is large. Therefore, when gas is generated in the outer packaging can 1, the generated gas can be released outside within a short period of time by the safety valve used in this embodiment rather than the conventional safety valve.

As described above, according to this embodiment, the plurality of linear thin portions are formed along at least two circumferences centering on the projecting portion, and the thin portion extending in the radial direction is formed across the end portions of the linear thin portions adjacent to each other. For this reason, a sufficient long distance can be obtained as the distance between the projecting portion and the lead in a current cut-off state, and a passage area for gas in a cleavage state increases. As a result, a current cut-off operation can be reliably performed in the current cut-off state, and the gas can be discharged within a short period of time in a cleavage state.

Before the current cut-off mechanism and the cleavage mechanism are described, normal states of the safety valve and the disk will be described.

FIG. 4A is a sectional view showing manners of the safety valve 6 and the disk 11 in the normal state in the nonaqueous electrolyte secondary battery according to this embodiment. FIG. 4A shows the upper portion of FIG. 1.

In FIG. 4A, although the sub-disk 4 closes the central hole 11c of the disk 11, the diameter of the sub-disk 4 is small. For this reason, the hole formed near the outer periphery of the disk 11 is not closed by the sub-disk 4. Since the peripheral hole 11d of the disk 11 is not closed as described above, a gas existing in the battery can pass through the disk 11. In contrast to this, since the safety valve 6 has no hole, the gas existing in the battery cannot be discharged outside, and an airtight state is kept. This state is the normal state shown in FIG. 2A.

An operation in the current cut-off mechanism of the safety valve will be described below.

FIG. 4B is a sectional view showing an action of the safety valve in a current cut-off state in the nonaqueous electrolyte secondary battery according to this embodiment.

When a gas is generated in the outer packaging can 1 for some reason, the internal pressure increases. At this time, the generated gas passes through the peripheral holes 11d of the disk 11 to pressure the internal surface of the safety valve 6. As a result, the safety valve 6 is pressed outside and expanded in the external direction to be transformed. This transformation increases the volume in the battery. Accordingly, the internal pressure can be moderated.

Due to the transformation of the safety valve 6, at the welded portion between the projecting portion 6a of the safety valve 6 and the sub-disk 4, the sub-disk 4 existing around the welded portion is torn by shearing force.

In this manner, when the projecting portion 6a and the sub-disk 4 are separated from each other, an electric connection between the positive electrode lead 9 of the electrode element 2 and the lid 7 is cut.

More specifically, the positive electrode lead 9 is electrically connected to the safety valve 6 through the sub-disk 4, the projecting portion 6a, the PTC element 3, and the lid 7. However, when the sub-disk 4 and the projecting portion 6a are separated from each other as described above, the electric connection between the anode lead 9 and the lid 7 is also cut.

The transformation will be described in detail here. As is apparent from FIG. 5B, when the safety valve 6 is transformed, the safety valve 6 is largely transformed at positions 6k and 6l.

More specifically, the portions are the position 6k which indicates the outer periphery of the inner flat region of the safety valve 6 and the position 6l which is very close to the projecting portion 6a. Other portions except for these portions, i.e., the projecting portion 6a is rarely transformed, and the flat portion outside a projecting portion 6s is also slightly transformed.

As is apparent from FIG. 4B, the distance between the bending points 6k and 6l is large.

For this reason, by the transformation of the safety valve 6, the projecting portion 6a is largely separated from the sub-disk 4.

In this manner, since the projecting portion 6a and the sub-disk 4 are largely separated from each other, an advantage that a current cut-off operation can be reliably performed is achieved.

An operation in the cleavage mechanism of the safety valve will be described below.

Figure 4C:
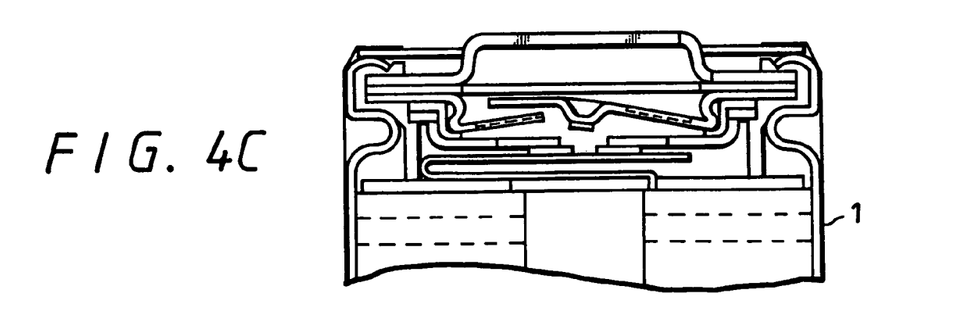

FIG. 4C is a sectional view showing the actions of a safety valve and a disk in a cleavage state in the nonaqueous electrolyte secondary battery according to this embodiment.

When the pressure in the outer packaging can 1 is higher than the pressure in the current cut-off state, the safety valve 6 itself is cleaved.

In this manner, when the safety valve 6 is cleaved, but when the disk 11 is cleaved, a gas generated in the battery passes through the peripheral holes 11d of the disk 11, passes through the cleaved portion 6b of the safety valve 6, and passes through a ventilation hole 7a of the lid 7 to be released outside.

An operation in the cleavage mechanism of the disk will be described below with reference to FIG. 2C.

When the pressure is further higher than the pressure at which the cleavage mechanism of the safety valve operates, the cleavage mechanism of the disk 11 operates. More specifically, a separate portion 11g of the disk 11 is separated from the disk 11. In this manner, the separate portion 11g is floated, and a cleaved portion 11h is formed around the separate portion 11g.

As a result, a gas generated in the battery can pass through not only the peripheral holes 11d of the disk, but also the cleaved portion 11h of the disk 11 at the same time. In addition, the generated gas passes through the cleaved portion 6b of the safety valve 6 and passes through the ventilation hole 7a of the lid 7 to be discharged outside.

A cleavage manner of the disk 11 will be described here with reference to FIG. 5. FIG. 5 is a plan view showing a manner of a disk used in the nonaqueous electrolyte secondary battery according to this embodiment in a cleavage state.

When a gas is generated in the battery, the gas passes through the peripheral holes 11d of the disk 11. In addition, when the pressure of the gas increases, a high pressure acts on the surface of the separate portion 11g on the electrode element 2 side.

When the high pressure acts as described above, large shearing force acts on the thin portion 11e of the disk 11.

In this case, the thin portion 11e is mechanically weakest, the thin portion 11e is easily sheared by the shearing force.

As a result, the separate portion 11g is separated from the disk 11 in the state shown in FIG. 5B.

The cleaved portion 11h is formed at the position where the thin portion 11e has been removed around the separate portion 11g.

In this manner, when the disk 11 is cleaved, a passage area for a gas in the cleavage state of the safety valve increases. In the description, although the disk is cleaved after the safety valve is cleaved, the present invention is not limited to this order. More specifically, depending on a generation state of the pressure in the battery, the disk may be cleaved simultaneously with the cleavage of the safety valve. Also in any state of these states, the cleavage mechanism of the disk effectively operates, a passage area for a gas can be increased.

As a result, the gas can be discharged within a short time in the cleavage state of the safety valve.

When the disk is cleaved, when the separate portion of the disk is floated from the disk, the separate portion may be in contact with the safety valve and may be electrically connected to the safety valve.

However, when the gas is released outside, this state is a state in which the battery itself cannot achieve the function of a battery. For this reason, the separate portion and the safety valve can be electrically connected to each other without any problem.

In this embodiment, the cylindrical nonaqueous electrolyte secondary battery has been described above. However, the application range of the present invention is not limited to the cylindrical nonaqueous electrolyte secondary battery. More specifically, the present invention can be applied to another battery having a pressure releasing mechanism as a matter of course.

The present invention is not limited to the above embodiment, and can employ various configurations without departing from the spirit and scope of the present invention.

The present invention achieves the effects described below.

A plurality of linear thin portions are formed along at least two circumferences centering on a projecting portion, and the thin portion extending in the radial direction is formed across the end portions of the linear thin portions adjacent to each other. For this reason, a current cut-off operation can be reliably performed in a current cut-off state, and a gas can be discharged within a short period of time in a cleavage state.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A safety valve for a battery, wherein at least a disk and the safety valve are arranged on one end side of a cylindrical outer packaging can holding an electrode element therein, wherein the disk has a central hole, and wherein a plurality of peripheral holes are located along a circle centering on a symmetrical point of the central hole, and the safety valve comprises:

a projecting portion projecting toward the electrode element at the central portion of the safety valve, wherein the projecting portion is connected to a lead of the electrode element through the central hole of the disk, wherein the disk has a linear thin portion, and wherein the safety valve has a plurality of linear thin portions formed almost along at least two circumferences centering on the projection portion; and a small circle having a small diameter and a circle having a large diameter, wherein a plurality of linear thin portions formed along the large diameter circle and a plurality of linear thin portions formed along the small diameter circle are formed almost equal to each other and centering on the projection portion.

2. A safety valve according to claim 1, wherein said thin portion is almost along a circle centering on a symmetrical point of the central hole.

3. A nonaqueous electrolyte secondary battery comprising said safety valve according to claim 1, wherein said battery comprises material which can dope and undope lithium as the positive electrode and negative electrode active materials, and a nonaqueous electrolyte.

4. A nonaqueous electrolyte secondary battery according to claim 3, wherein said battery comprising an electrode member constituted by laminating the positive electrode and the negative electrode across a separator and wound in the shape of a spirally coiled electrode.

* * * * *